(12) United States Patent
Zhang et al.

(10) Patent No.: US 11,768,268 B2
(45) Date of Patent: Sep. 26, 2023

(54) SYSTEMS AND METHODS FOR MOBILE PLATFORM LOCALIZATION USING ULTRA WIDE BAND (UWB) SIGNALS

(71) Applicant: GM GLOBAL TECHNOLOGY OPERATIONS LLC, Detroit, MI (US)

(72) Inventors: Xinliang Zhang, Shanghai (CN); Jieping Wang, Shanghai (CN); Li Shen, Shanghai (CN); Zhijun Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 17/112,139

(22) Filed: Dec. 4, 2020

(65) Prior Publication Data

US 2022/0179035 A1    Jun. 9, 2022

(51) Int. Cl.
*G01S 3/02* (2006.01)
*G01S 5/04* (2006.01)
*G01S 5/02* (2010.01)

(52) U.S. Cl.
CPC ............ *G01S 5/04* (2013.01); *G01S 5/02213* (2020.05); *G01S 5/021* (2013.01); *G01S 5/0244* (2020.05); *G01S 5/0249* (2020.05)

(58) Field of Classification Search
CPC ........ G01S 5/04; G01S 5/02213; G01S 5/021; G01S 5/0244; G01S 5/0249; G01S 1/02
USPC ........................................ 342/450, 451, 386
See application file for complete search history.

(56) References Cited

U.S. PATENT DOCUMENTS

| | | | | |
|---|---|---|---|---|
| 7,411,551 | B2* | 8/2008 | Choi | G01S 13/878 342/465 |
| 8,041,301 | B2* | 10/2011 | Zuniga | H04W 72/0406 455/154.1 |
| 9,241,353 | B2* | 1/2016 | Do | G01S 5/021 |
| 9,900,918 | B2* | 2/2018 | Do | H04W 64/00 |
| 10,365,363 | B2* | 7/2019 | Rohr | G01C 21/12 |
| 10,705,179 | B2* | 7/2020 | Gao | H04B 17/21 |
| 10,942,249 | B2* | 3/2021 | Ding | G01S 5/0231 |
| 10,942,250 | B2* | 3/2021 | Bartov | G01S 5/14 |
| 11,385,320 | B2* | 7/2022 | Al-Kadi | G01S 5/02585 |

(Continued)

FOREIGN PATENT DOCUMENTS

EP    2733502 A1 *    5/2014    ............... G01S 1/68

*Primary Examiner* — Chuong P Nguyen
(74) *Attorney, Agent, or Firm* — Lorenz & Kopf LLP

(57) ABSTRACT

Systems and methods for mobile platform localization for a mobile platform. The system includes three independent ultra-wideband (UWB) sensors mounted on the mobile platform and a UWB localization module operationally coupled to the first UWB sensor, the second UWB sensor, and the third UWB sensor, and programmed by programming instructions to: identify first beacon UWB transmissions from a first beacon external to the mobile platform and generate a spatial location of the first beacon; identify second beacon UWB transmissions from a second beacon external to the mobile platform and generate a spatial location of the second beacon; identify third beacon UWB transmissions from a third beacon located external to the mobile platform; and generate a spatial location of the mobile platform, as a function of the spatial location of the first beacon, the spatial location of the second beacon, and the spatial location of the third beacon.

19 Claims, 6 Drawing Sheets

(56) References Cited

U.S. PATENT DOCUMENTS

| | | | |
|---|---|---|---|
| 2010/0309051 A1* | 12/2010 | Moshfeghi | H04W 64/006 342/451 |
| 2012/0326929 A1* | 12/2012 | Belloni | G01S 1/24 342/386 |
| 2015/0029945 A1* | 1/2015 | Do | G01S 5/0263 370/329 |
| 2016/0349362 A1* | 12/2016 | Rohr | G01S 17/06 |
| 2016/0357193 A1* | 12/2016 | Bruemmer | G05D 1/106 |
| 2017/0023659 A1* | 1/2017 | Bruemmer | G01S 5/0278 |
| 2021/0149015 A1* | 5/2021 | Bartov | G01S 5/30 |

* cited by examiner

SYSTEMS AND METHODS FOR MOBILE PLATFORM LOCALIZATION USING ULTRA WIDE BAND (UWB) SIGNALS

TECHNICAL FIELD

The present disclosure generally relates to localization systems for mobile platforms, and more particularly relates to systems and methods for mobile platform localization using ultra-wide band (UWB) signals.

Mobile platform design is evolving to provide more and more driver-assist features and driverless features. For these features to operate reliably, an awareness of the location and context of the mobile platform is required. Additionally, many onboard systems require being supplied with the location of the mobile platform. As used herein, localization includes the process of adapting the mobile platform to a specific location.

Many available localization solutions utilize a global positioning system (GPS) for this determination. However, in some scenarios, a GPS system is not available or not reliable. One such example is when a mobile platform is inside a structure, such as a tunnel or parking garage. In these scenarios, even if the mobile platform is equipped with the GPS system, the signal quality inside the structure may be too poor for the GPS system to operate properly.

Accordingly, improved systems and methods for mobile platform localization are desired. The following disclosure provides a technological solution to the above technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

In an embodiment, a mobile platform localization system for a mobile platform is provided. The system includes: a first ultra-wideband (UWB) sensor mounted on the mobile platform; a second UWB sensor mounted on the mobile platform; a third UWB sensor mounted on the mobile platform; a UWB localizer circuit operationally coupled to the first UWB sensor, the second UWB sensor, and the third UWB sensor, and programmed by programming instructions to: receive, from a first beacon located external to the mobile platform, first beacon UWB transmissions; identify the first beacon and generate a spatial location of the first beacon; receive, from a second beacon located external to the mobile platform, second beacon UWB transmissions; identify the second beacon and generate a spatial location of the second beacon; receive, from a third beacon located external to the mobile platform, third beacon UWB transmissions; and identify the third beacon and generate a spatial location of the third beacon; and generate a spatial location of the mobile platform, as a function of the spatial location of the first beacon, the spatial location of the second beacon, and the spatial location of the third beacon.

In an embodiment, the UWB localizer circuit is further programmed to utilize triangle localization to generate the spatial location of the first beacon, the spatial location of the second beacon, and the spatial location of the third beacon.

In an embodiment, the UWB localizer circuit is further programmed to utilize triangle localization to generate the spatial location of the mobile platform.

In an embodiment, the UWB localizer circuit is further configured to provide the spatial location of the mobile platform to an integrated localization module onboard the mobile platform.

In an embodiment, further including: a database of map information; and wherein the UWB localizer circuit is further configured to reference the map information to validate the spatial location of the mobile platform.

In an embodiment, the UWB localizer circuit is further configured to provide the spatial location of the mobile platform to an integrated localization module onboard the mobile platform.

In an embodiment, further including: a database of map information; and wherein the UWB localizer circuit is further configured to reference the map information to validate the spatial location of the mobile platform.

In another embodiment, a method for mobile platform localization system for a mobile platform is provided. The method includes: receiving, from a first beacon located external to the mobile platform, first beacon ultra-wideband (UWB) transmissions at a first ultra-wideband (UWB) sensor mounted on the mobile platform, a second UWB sensor mounted on the mobile platform, and a third UWB sensor mounted on the mobile platform; identifying the first beacon and generating a spatial location of the first beacon; receiving, from a second beacon located external to the mobile platform, second beacon UWB transmissions at the first UWB sensor, the second UWB sensor, and the third UWB sensor; identifying the second beacon and generating a spatial location of the second beacon; receiving, from a third beacon located external to the mobile platform, third beacon UWB transmissions at the first UWB sensor, the second UWB sensor, and the third UWB sensor; identifying the third beacon and generating a spatial location of the third beacon; and generating a spatial location of the mobile platform, as a function of the spatial location of the first beacon, the spatial location of the second beacon, and the spatial location of the third beacon.

In an embodiment, further including utilizing triangle localization to generate the spatial location of the first beacon, the spatial location of the second beacon, and the spatial location of the third beacon.

In an embodiment, further including utilizing triangle localization to generate the spatial location of the mobile platform.

In an embodiment, further including providing the spatial location of the mobile platform to an integrated localization module onboard the mobile platform.

In an embodiment, further including referencing a database of map information; and validating the spatial location of the mobile platform using the map information.

In an embodiment, further including providing the spatial location of the mobile platform to an integrated localization module onboard the mobile platform.

In an embodiment, further including referencing a database of map information; and validating the spatial location of the mobile platform using the map information.

Another embodiment of a mobile platform localization system for a mobile platform is provided. The system includes: a first ultra-wideband (UWB) sensor mounted on the mobile platform; a second UWB sensor mounted on the mobile platform; a third UWB sensor mounted on the mobile platform; a UWB localization module configured to receive input from the first UWB sensor, the second UWB sensor, and the third UWB sensor, and configured to: identify first beacon UWB transmissions from a first beacon external to the mobile platform and generate a spatial location of the first beacon; identify second beacon UWB transmissions from a second beacon external to the mobile platform and generate a spatial location of the second beacon; identify third beacon UWB transmissions from a third beacon located external to the mobile platform; and generate a spatial location of the mobile platform, as a function of the spatial location of the first beacon, the spatial location of the second beacon, and the spatial location of the third beacon.

In an embodiment, the UWB localizer module includes a triangulation module for programmed to utilize triangle localization to generate the spatial location of the first beacon, the spatial location of the second beacon, and the spatial location of the third beacon.

In an embodiment, the UWB localizer module further includes an output module to generate the spatial location of the mobile platform using a triangle location method.

In an embodiment, the output module further provides the spatial location of the mobile platform to an integrated localization module onboard the mobile platform.

In an embodiment, the UWB localizer module further includes a mapping module that references stored map information and validates the spatial location of the mobile platform based on the map information.

In an embodiment, the UWB localizer module further provides the spatial location of the mobile platform to an integrated localization module onboard the mobile platform.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
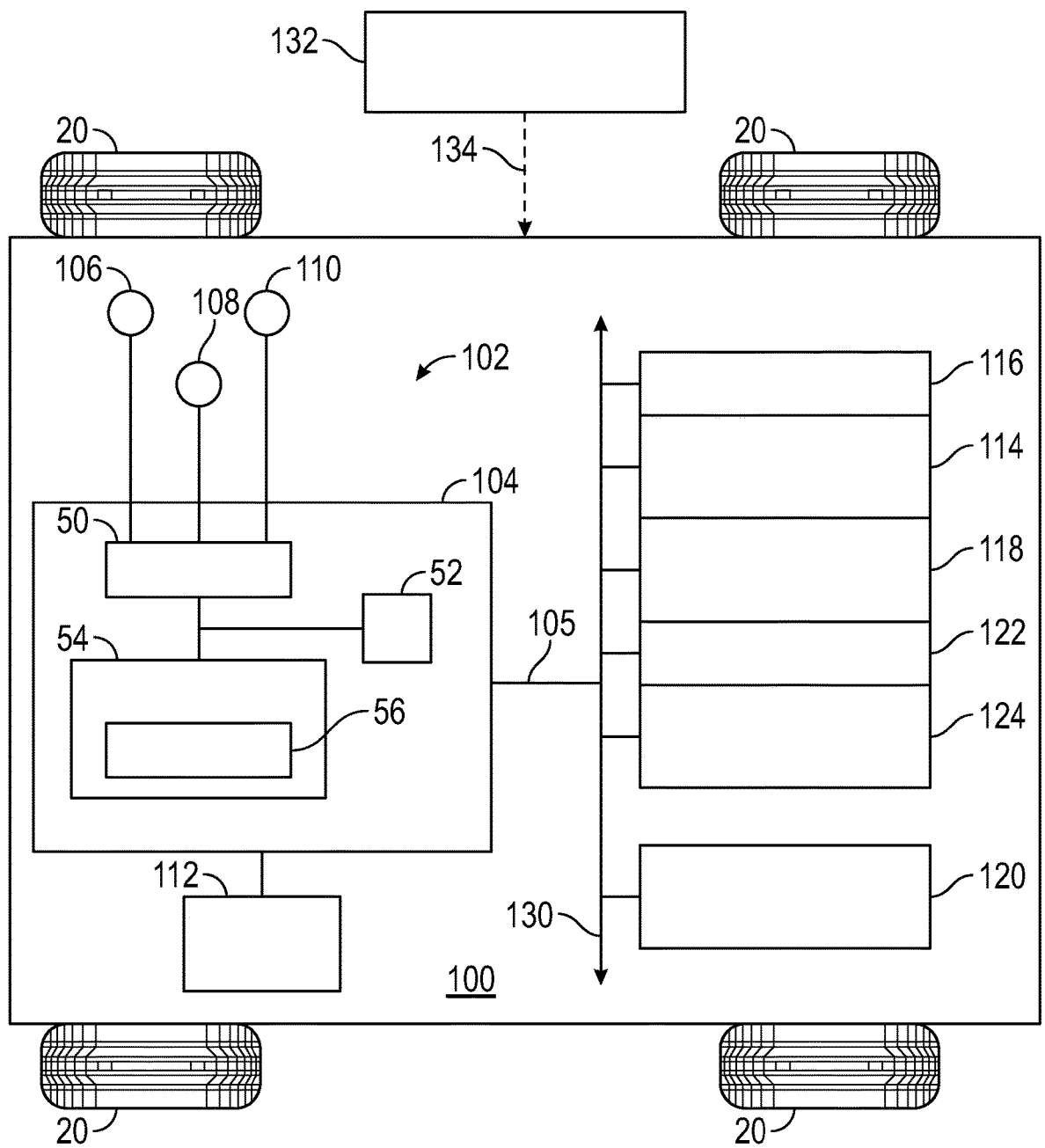
FIG. 1 is a schematic diagram illustrating a UWB localization system implemented onboard a vehicle, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, localization includes the process of adapting the mobile platform to a specific location. Many current driver-assist features, driverless features, and systems and module onboard mobile platforms need to adapt to the location and context of the mobile platform to operate reliably. While many available localization solutions utilize a global positioning system (GPS) for a mobile platform location, there are some scenarios in which a GPS system is not available or not reliable. One such example is when a mobile platform is inside a structure, such as a tunnel or parking garage. In these scenarios, even if the mobile platform is equipped with the GPS system, a technical problem exists when the signal quality inside the structure is too poor for the GPS system to operate properly.

Accordingly, embodiments provide a technical solution to this problem using transmissions from ultra-wideband (UWB) beacons distributed inside structures. UWB transmissions offer some advantages over other technologies for localizing mobile platforms. Information, such as a beacon identification (ID), can be encoded into a UWB pulse. UWB pulse systems can provide a high data rate that also has a high level of accuracy and transmission speed. In some examples, UWB transmission speeds can be at least 600 megabits per second (Mbits/sec). UWB is also desirable because UWB systems easily lend themselves to a determination of a "time of flight" which can be converted to a distance and used to construct a spatial environment for the mobile platform.

Exemplary embodiments of the mobile platform localization system and methods provide a robust spatial location of the mobile platform in scenarios where GPS is unavailable by using UWB transmissions. Onboard applications and modules that receive the spatial location of the mobile platform generated by present embodiments may experience improved reliability and safety. The technologically enhanced mobile platform localization system and method are described in more detail in connection with the figures below.

FIG. 1 depicts an example mobile platform. The example mobile platform is a vehicle 100 that is capable of movement and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels 20, each of which are rotationally coupled to the chassis near a respective corner of the body. The vehicle 100 is depicted with four wheels 20, but the number of wheels 20 may vary in other embodiments. The vehicle 100 may be autonomous or semi-autonomous. The vehicle 100 includes a collective functional block, drive systems 114, which generally includes known vehicle systems for vehicle operation, such as, a propulsion system, a transmission system, a steering system, actuators for the wheels (traction control), and a brake system, and generates a variety of signals, including vehicle speed and vehicle acceleration. The drive systems 114 may include a parking module 116, for automatic or assisted parking. The drive systems 114 and parking module 116 may be available via an onboard bus 130.

The vehicle 100 includes a mobile platform localization system, shown generally as system 102, which is communicatively coupled to the drive systems 114. Three UWB sensors (a first UWB sensor 106, a second UWB sensor 108, and a third UWB sensor 110) are mounted on the mobile platform 100 and communicatively coupled to the system 102, and in various embodiments, a database 112 of map information is also communicatively coupled to the system 102. Output of the system 102 is a spatial location 105 of the mobile platform, which may be placed on the communication bus 130 for use by various onboard systems and modules.

Some additional onboard systems and modules that may be communicatively coupled to the system 102, via the bus 130, include an integrated localization module 118 (which may include a GPS and/or object recognition modules), a central platform controller 120, an infotainment system 122, and various cabin environmental controls 124. The functions and operations of each of these components are described in more detail below.

The central platform controller 120 may receive and integrate communications from a variety of modules and systems known to be present vehicle 100. Accordingly, inputs provided by the central platform controller 120 to the system 102 may incorporate user inputs, mobile applications and systems, and off-board communications (e.g., via a transceiver).

The infotainment system 122 may include display units, user input devices, speakers, and the like. Cabin environmental controls 124 may include lighting and heating, ventilation, and air-conditioning controls.

Figure 5:
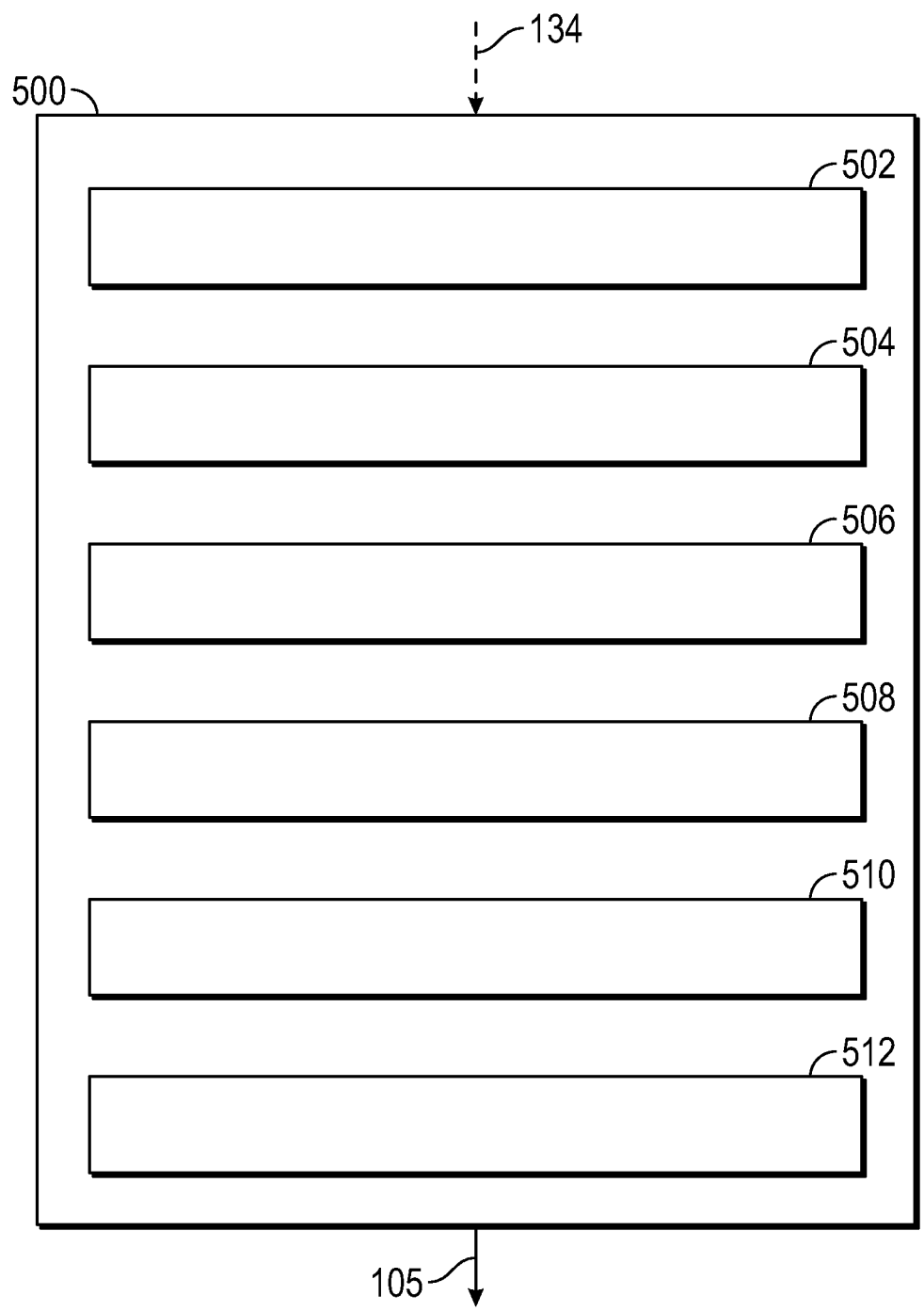
FIG. 5. is an architectural block diagram of one or more application modules that may be operating in the UWB localization system.

In various embodiments, the system 102 may be described in terms of UWB localizer circuit 104, as shown in FIG. 1, or as a plurality of application modules, as shown in FIG. 5. Additionally, in various embodiments, the UWB localizer circuit 104 may be implemented as an enhanced computer processor, as shown in FIG. 1, or, as an application specific integrated circuit (ASIC); a field programmable gate array (FPGA); any suitable programmable logic device; combinational logic circuit including discrete gates or transistor logic; discrete hardware components and memory devices; and/or any combination thereof, designed to perform the functions described herein.

The UWB localizer circuit 104 of FIG. 1 is an enhanced computer system including a computer readable storage device or media, memory 54, for storage of instructions, algorithms, and/or programs, such as program 56 and a plurality of preprogrammed thresholds and parameters, the processor 50 to execute the program 56, and input/output interface (I/O) 52. The computer readable storage device or media, memory 54, may include volatile and nonvolatile storage in read-only memory (ROM), random-access memory (RAM), and keep-alive memory (KAM), for example. KAM is a persistent or nonvolatile memory that may be used to store various operating variables while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling aspects of the vehicle 100. In various embodiments, processor 50 is configured to implement the system 102. The memory 54 may also be utilized by the processor 50 to cache data, to store results of comparisons and analyses, and the like. Information in the memory 54 may be organized and/or imported from an external source during an initialization or installment operation in a method; it may also be programmed via a user input device.

The input/output interface (I/O) 52 may be operationally coupled to the processor 50 via a bus and enables intra-system 102 communication as well as extra-system 102 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses. During operation of the system 102, the processor 50 loads and executes one or more algorithms, instructions, and rules embodied as program 56, and, as such, controls the general operation of the system 102. Depending on the embodiment of the system 102, it may perform operations in accordance with an algorithm, perform operations in accordance with state machine logic, perform operations in accordance with logic in a programmable logic array, or the like.

Program 56 includes a SLAM algorithm (Simultaneous Localization And Mapping). In some applications, SLAM algorithms are used to help a robot localize itself in a new environment. Some SLAM algorithms are implemented with vision or camera as input. The novel system 102 innovatively uses received UWB transmissions as input to SLAM. Using triangulation and SLAM in a novel combination, the system 102 is able to localize the beacons and the mobile platform 100 simultaneously, which is important for a moving vehicle.

Figure 2:
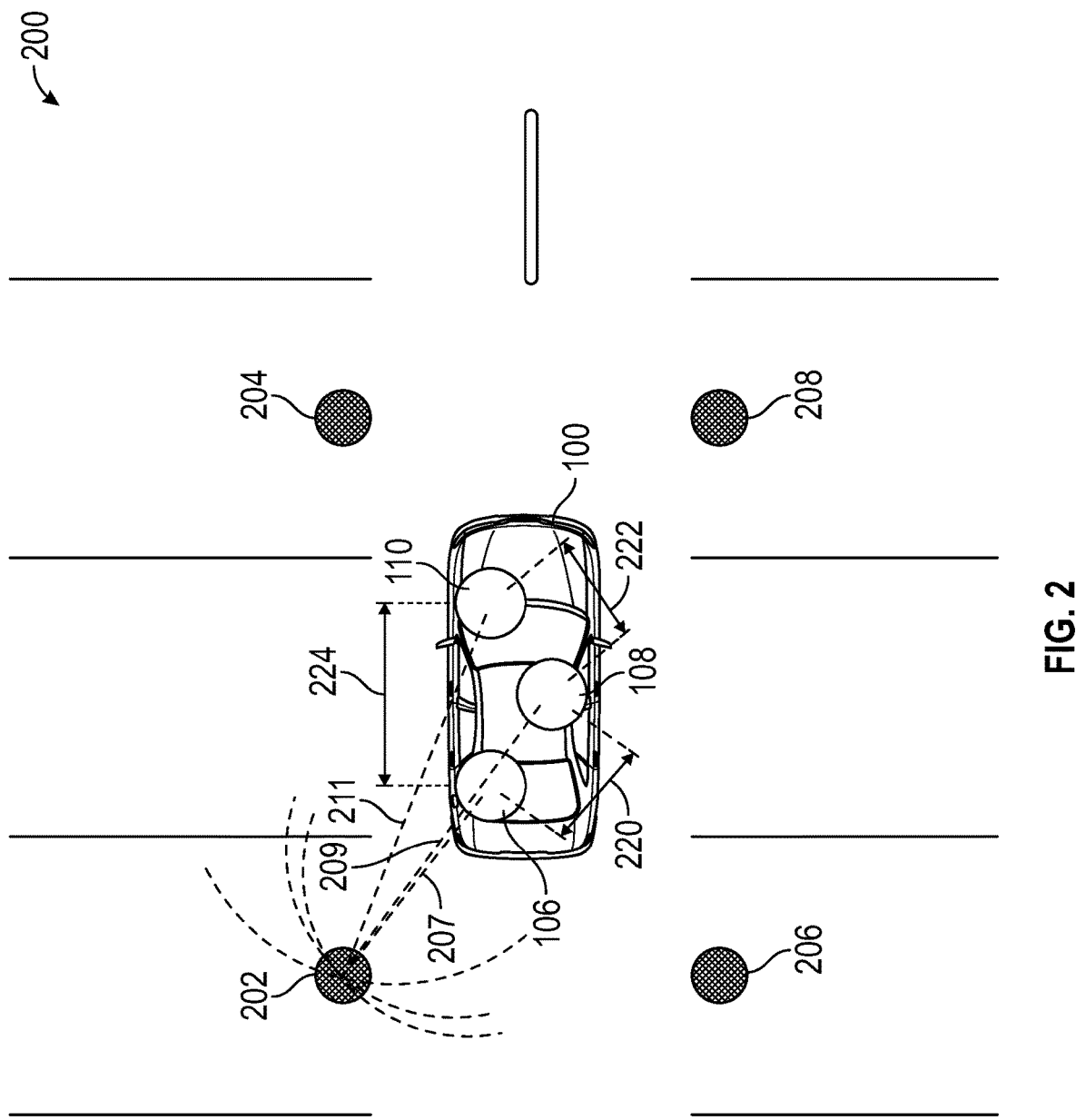
FIGS. 2-4 are illustrations for discussion of concepts of UWB localization in accordance with various embodiments.
Figure 3:
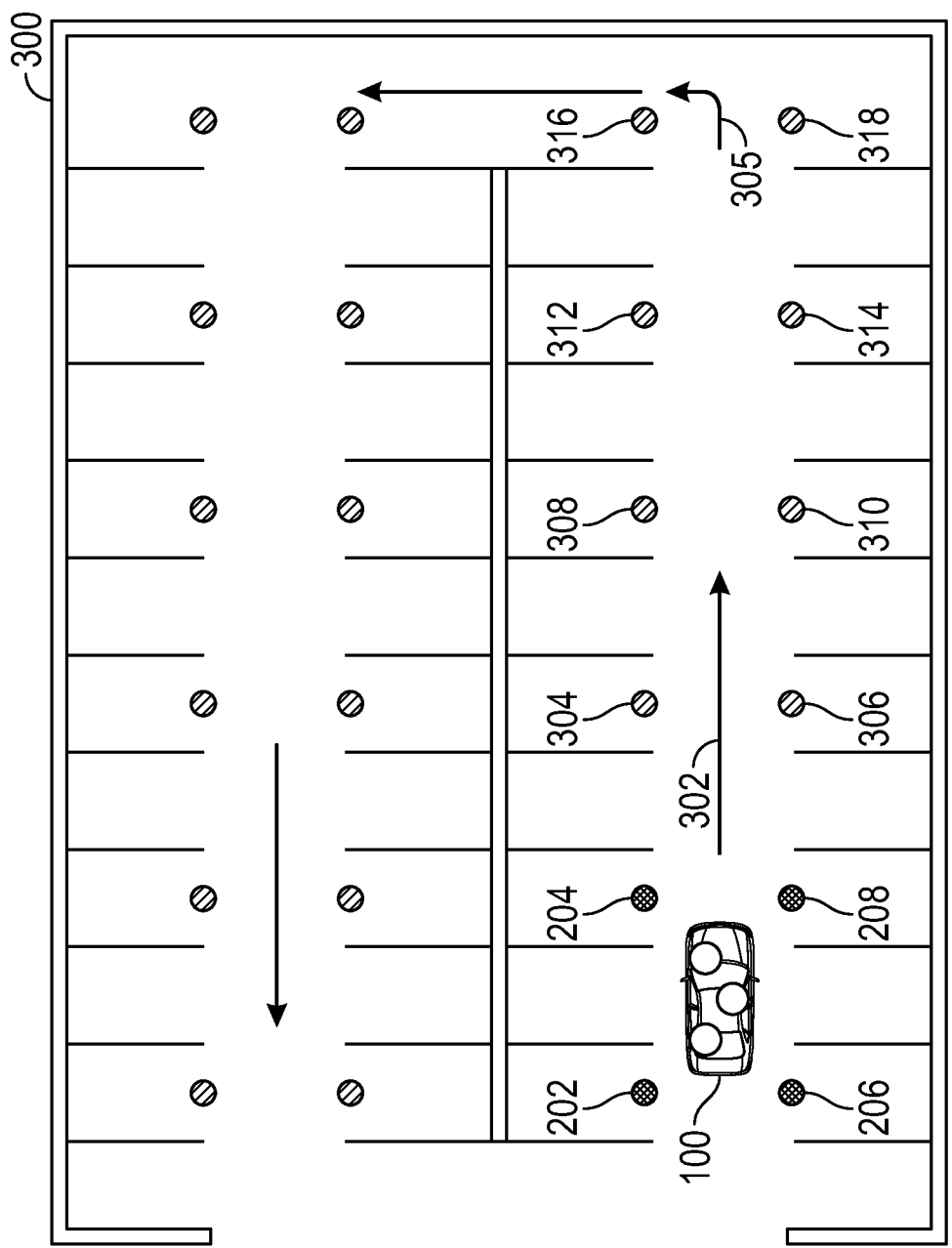

The three UWB sensors (first UWB sensor 106, second UWB sensor 108, and third UWB sensor 110) are configured to sense, or receive, UWB transmissions 134 from external UWB beacons 132. (As used herein, the external sources of UWB transmissions are referred to as beacons, and the UWB components onboard the mobile platform are referred to as UWB sensors). Turning now to FIGS. 2-3, and with continued reference to FIG. 1, the three UWB sensors are mounted on the mobile platform 100, arranged in a triangle. A distance 220 separates UWB 1 from UWB 2, a distance 222 separates UWB 2 from UWB 3, and a distance 224 separates UWB 3 from UWB 1. Although these separations are shown in a plane of two dimensions, in practice they may each have a third dimension. It is not as important what these dimensions are, as it is that they are known or discoverable by the system 102, and that the sensors are not in a straight line. In an initialization step, the system 102 may perform a handshake with each of the UWB sensors to discover specifications of the three UWB sensors and assign coordinates to each of the three UWB sensors for future operations described below.

In FIG. 2, the mobile platform 100 is depicted in a space 200 immediately surrounding it in which a first external UWB beacon (shortened herein to first beacon 202), second beacon 204, third beacon 206 and fourth beacon 208 are present around the mobile platform 100. Each of the beacons is concurrently transmitting UWB transmissions. Dashed lines are used to indicate the pulsed UWB transmissions from the first beacon 202, referred to as first beacon UWB transmissions. For simplicity, and to envision the construction of triangles for triangulation, the sensed transmissions are shown as a single line, however, in practice, incoming signals may have a pulse bandwidth. At onboard UWB sensor 106, first beacon UWB transmission 207 is sensed; at onboard UWB sensor 108, first beacon UWB transmission 209 is sensed; and, at onboard UWB sensor 110, first beacon UWB transmission 211 is sensed.

The information in each UWB transmission from a beacon includes a beacon identification for the respective beacon. For example, for these purposes, the identification of beacon 202 will be referred to as "beacon 202," but in practice it may include specification details. The system 102 receives the first beacon UWB transmissions in real time, sensed by the UWB sensors. The system 102 can identify the first beacon 202 by processing the first beacon UWB transmissions simultaneously sensed at each of the three UWB sensors (first UWB sensor 106, second UWB sensor 108, and third UWB sensor 110).

Additionally, using the assigned spatial location of each of the three UWB sensors, the system 102 can generate the spatial location of the beacon 202 using triangle localization techniques encoded in the program 56. The system 102 similarly receives and identifies second UWB transmissions from a second beacon and third UWB transmissions from a third beacon (e.g., second beacon 204 and third beacon 206, or second beacon 206 and third beacon 208, etc.), and similarly generates the spatial location for the second beacon and the third beacon (e.g., second beacon 204 and third beacon 206, or second beacon 206 and third beacon 208, etc.). In various embodiments, the spatial location is defined in a coordinate system, in three dimensions. In various embodiments, the spatial location is defined in a coordinate system, in four dimensions. In various embodiments, the spatial location is defined in a cartesian coordinate system. At this point, the system 102 has used triangle localization to locate at least three different beacons in the space 200 immediately around the mobile platform 100.

In FIG. 3, the space 200 is shown within a larger space of a structure 300. In practice, the first beacon, second beacon, and third beacon described above are three of a plurality of UWB beacons (304, 306, 308, 310, 312, 314, 316, and 318). The mobile platform 100 moves in any direction, and as the system 102 operates, it continuously locates at least three beacons, and then updates the location of the mobile platform 100 and tracks the location of mobile platform 100 based thereon. In the example shown in FIG. 3, the mobile platform 100 has entered the structure 300 from the left of the page, is headed in direction 302 (right on the page), and should turn left (upwards on the page) at the end of the structure 300, as indicated by arrow 305.

Figure 4:
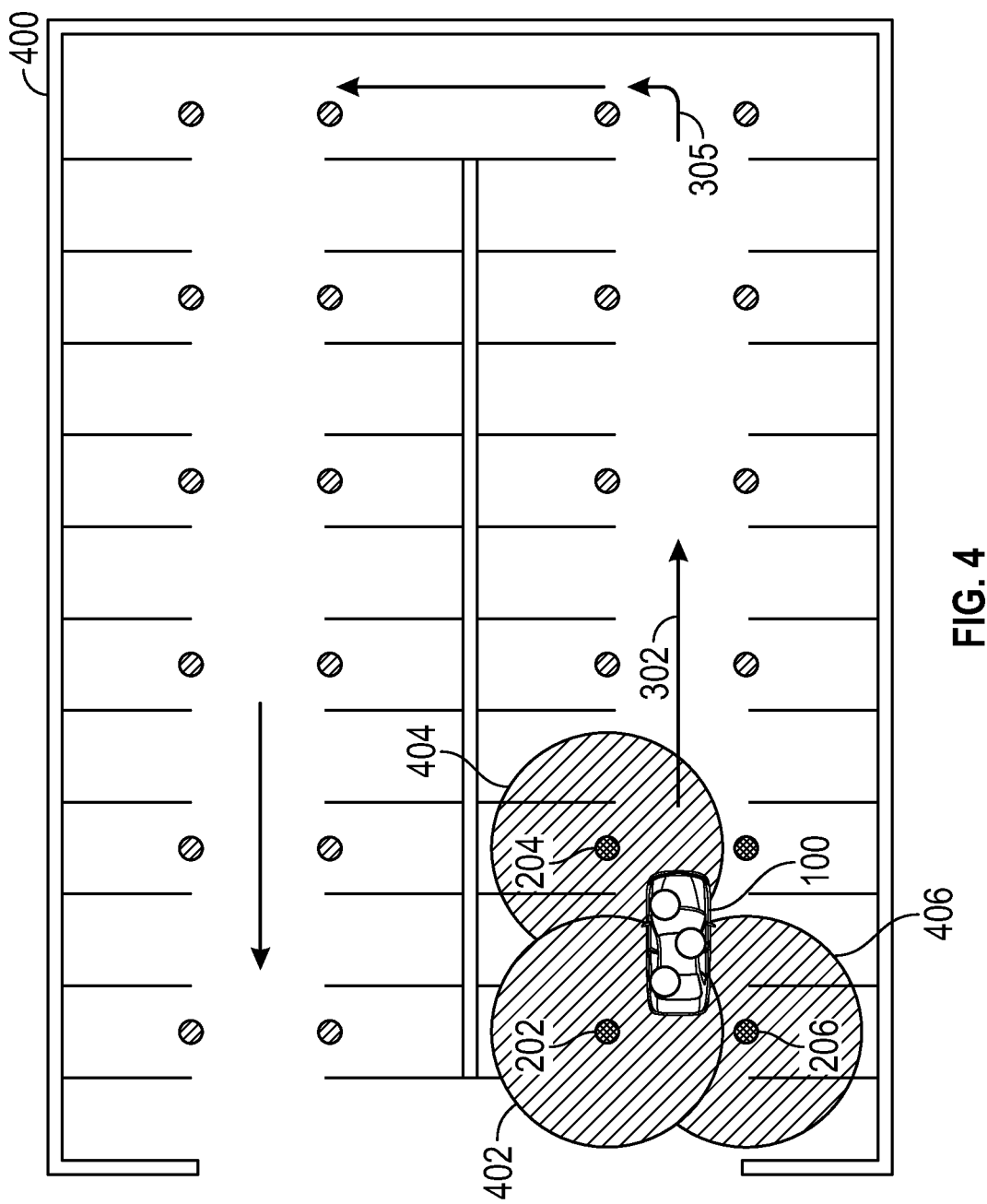

Turning now to FIG. 4, the system 102 uses the locations of the three beacons, as determined above, to generate therefrom a spatial location 105 for the mobile platform 100. This step again employs triangulation or triangle localization. The system 102 constructs a volume 402 surrounding beacon 202, a volume 404 surrounding beacon 204 and a volume 406 surrounding beacon 206. The triangulation of the three volumes, where they overlap, is determined to indicate the spatial location of the mobile platform 100. In various embodiments, the spatial location 105 for the mobile platform 100 is provided to the integrated localization module 118 for further processing.

As may be appreciated, as the mobile platform 100 moves through the structure 300, the three UWB sensors will sense different beacons, losing UWB transmissions from beacons that it moves away from, and sensing additional UWB transmissions from beacons that it moves toward. The system 102 includes the ability to continuously detect a plurality of beacons and select three beacons from among the detected plurality for use for determining/generating the spatial location of the mobile platform 100 at any time.

In embodiments having access to map information (e.g., via database 112), the system 102 may reference the map information to perform additional practical applications, such as, to validate the determined spatial location, or to integrate the spatial location 105 with commands for onboard modules to adapt based on the spatial location of the vehicle with respect to a map. For example, if the map information indicated that there is an electric vehicle recharge station at a certain parking stall, the spatial location 105 may be used to drive the mobile platform 100 to the stall and park it there. In another example, the map information may be used in conjunction with the vehicle spatial location 105 to determine when to slow down the mobile platform 100 and when to turn a steering wheel.

While the exemplary embodiment of the system 102 is described in the context of a fully functioning enhanced computer system, those skilled in the art will recognize that the mechanisms of the present disclosure are capable of being distributed as a program product including program 56 and associated parameters.

Turning now to FIG. 5, such a program product may comprise an arrangement of instructions organized as multiple interdependent program code modules, each configured to achieve a separate process and/or perform a separate algorithmic operation, arranged to manage data flow through the system 102. The program code modules in UWB localization module 500 may each comprise an ordered listing of executable instructions for implementing logical functions for the processes performed by the system 102. The instructions in the program code modules within UWB localization module 500, when executed by a processor (e.g. processor 50), cause the processor to receive and process signals, and perform logic, calculations, methods and/or algorithms as described herein for automatically and in real-time generating a spatial location 105 of the mobile platform.

Once developed, the program code modules of UWB localization module 500 constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

With continued reference to FIG. 5, UWB localization module 500 may be configured to operate on input from the three UWB sensors onboard the mobile platform 100. A module 502 for identifying UWB beacon transmissions at onboard sensors and a module 504 for assigning spatial locations to the onboard sensors may each provide input into a triangulation module 506 for generating spatial locations of beacons using triangulation. A module 508 may be used for selecting three independent beacons to use in the next steps. Module 508 also adapts to movement of the mobile platform 100 by adding a new located beacon (e.g., beacon 304) and deleting a beacon (e.g., beacon 202). As alluded to, there may be multiple combinations of three beacons to use. Module 508 is capable of using a priority function to select three beacons when many beacons are concurrently available. In an embodiment, the priority check is a proximity; in another embodiment, the priority check is a signal strength. An output module 510 may generate the spatial location 105 of the mobile platform using triangle localization. In various embodiments, a mapping module 512 further references map information and generates commands and controls for onboard systems and modules as a function of map information and the spatial location of the mobile platform 100.

Figure 6:
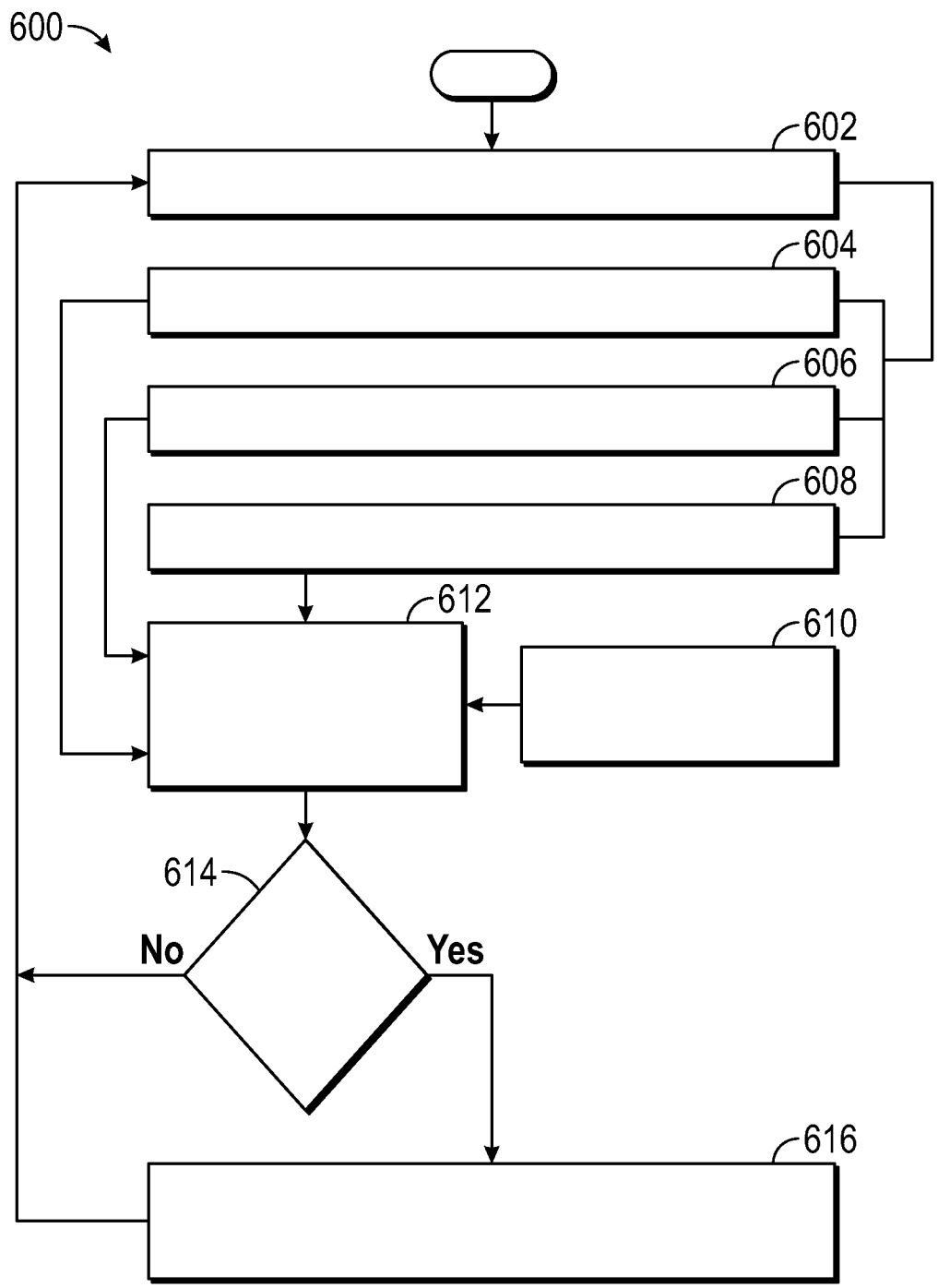
FIG. 6 is a process flow chart depicting an example method for UWB localization on a mobile platform, in accordance with various embodiments.

Turning now to FIG. 6, the system 102 described above may be implemented by a processor-executable method for vision sensing, shown generally as method 600. For illustrative purposes, the following description of method 600 may refer to elements mentioned above in connection with FIGS. 1-5. In practice, portions of method 600 may be performed by different components of the described system 102. It should be appreciated that method 600 may include any number of additional or alternative operations and tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

At 602, the system 102 is receiving UWB transmissions 134 and the onboard UWB sensors are sensing the UWB transmissions 134. At 604, the first UWB sensor 106 is identifying a first beacon transmission. At 606, the second UWB sensor 108 is identifying a first beacon transmission; and, at 608, the third UWB sensor 110 is identifying a first beacon transmission. At 610, the system 102 assigns spatial locations to the three onboard beacons.

At 612, the system generates a spatial location of the first beacon using triangle localization techniques, as a function of the output from 604, 606, 608, and 610. At 614, the system determines whether or not three different beacons have been located. If not, the method returns to 602 to identify and locate another beacon. When three different beacons have been located at 614, the method moves to 616 and generates the spatial location 105 of the mobile platform 100, as a function of UWB signals generated by the three located beacons. After 616, the method may return to 602 or end.

In summary, to simultaneously locate a UWB beacon and an onboard senor at 616, the program 56 employs a SLAM algorithm and triangulation techniques. By implementing the principle of SLAM and performing triangulation twice, the system 102 provides a technological improvement over available systems.

Thus, improved systems and methods for mobile platform localization are provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A mobile platform localization system for a mobile platform, comprising:
    a first ultra-wideband (UWB) sensor mounted on the mobile platform;
    a second UWB sensor mounted on the mobile platform;
    a third UWB sensor mounted on the mobile platform;
    wherein the first UWB sensor, the second UWB sensor, and the third UWB sensor are mounted according to a non-linear arrangement;
    a UWB localizer circuit operationally coupled to the first UWB sensor, the second UWB sensor, and the third UWB sensor, and programmed by programming instructions to:
    receive, from the first UWB sensor, the second UWB sensor and the third UWB sensor, first beacon UWB transmissions sensed from a first beacon located external to the mobile platform;
    identify the first beacon and generate a spatial location of the first beacon based on the first beacon UWB transmissions;
    receive, from the first UWB sensor, the second UWB sensor and the third UWB sensor, second beacon UWB transmissions sensed from a second beacon located external to the mobile platform;
    identify the second beacon and generate a spatial location of the second beacon based on the second beacon UWB transmissions;
    receive, from the first UWB sensor, the second UWB sensor and the third UWB sensor, third beacon UWB transmissions sensed from a third beacon located external to the mobile platform; and
    identify the third beacon and generate a spatial location of the third beacon based on the third beacon UWB transmissions; and
    generate a spatial location of the mobile platform, as a function of the spatial location of the first beacon, the spatial location of the second beacon, and the spatial location of the third beacon.

2. The mobile platform localization system of claim 1, wherein the UWB localizer circuit is further programmed to utilize triangle localization to generate the spatial location of the first beacon, the spatial location of the second beacon, and the spatial location of the third beacon.

3. The mobile platform localization system of claim 2, wherein the UWB localizer circuit is further programmed to utilize triangle localization to generate the spatial location of the mobile platform.

4. The mobile platform localization system of claim 3, wherein the UWB localizer circuit is further configured to provide the spatial location of the mobile platform to an integrated localization module onboard the mobile platform.

5. The mobile platform localization system of claim 4, further comprising:
   a database of map information; and
   wherein the UWB localizer circuit is further configured to reference the map information to validate the spatial location of the mobile platform.

6. The mobile platform localization system of claim 1, wherein the UWB localizer circuit is further configured to provide the spatial location of the mobile platform to an integrated localization module onboard the mobile platform.

7. The mobile platform localization system of claim 1, further comprising:
   a database of map information; and
   wherein the UWB localizer circuit is further configured to reference the map information to validate the spatial location of the mobile platform.

8. A method for mobile platform localization system for a mobile platform, comprising:
   receiving, from a first beacon located external to the mobile platform, first beacon ultra-wideband (UWB) transmissions at a first ultra-wideband (UWB) sensor mounted on the mobile platform, at a second UWB sensor mounted on the mobile platform, and at a third UWB sensor mounted on the mobile platform, wherein the first UWB sensor, the second UWB sensor, and the third UWB sensor are mounted according to a non-linear arrangement;
   identifying the first beacon and generating a spatial location of the first beacon based on the first beacon UWB transmissions;
   receiving, from a second beacon located external to the mobile platform, second beacon UWB transmissions at the first UWB sensor, at the second UWB sensor, and at the third UWB sensor;
   identifying the second beacon and generating a spatial location of the second beacon based on the second beacon UWB transmissions;
   receiving, from a third beacon located external to the mobile platform, third beacon UWB transmissions at the first UWB sensor, at the second UWB sensor, and at the third UWB sensor;
   identifying the third beacon and generating a spatial location of the third beacon based on the third beacon UWB transmissions; and
   generating a spatial location of the mobile platform, as a function of the spatial location of the first beacon, the spatial location of the second beacon, and the spatial location of the third beacon.

9. The method for mobile platform localization of claim 8, further comprising utilizing triangle localization to generate the spatial location of the first beacon, the spatial location of the second beacon, and the spatial location of the third beacon.

10. The method for mobile platform localization of claim 9, further comprising utilizing triangle localization to generate the spatial location of the mobile platform.

11. The method for mobile platform localization of claim 10, further comprising providing the spatial location of the mobile platform to an integrated localization module onboard the mobile platform.

12. The method for mobile platform localization of claim 11, further comprising
   referencing a database of map information; and
   validating the spatial location of the mobile platform using the map information.

13. The method for mobile platform localization of claim 8, further comprising providing the spatial location of the mobile platform to an integrated localization module onboard the mobile platform.

14. The method for mobile platform localization of claim 8, further comprising referencing a database of map information; and
   validating the spatial location of the mobile platform using the map information.

15. A mobile platform localization system for a mobile platform, comprising:
   a first ultra-wideband (UWB) sensor mounted on the mobile platform;
   a second UWB sensor mounted on the mobile platform;
   a third UWB sensor mounted on the mobile platform;
   a UWB localization module communicatively coupled to the first UWB sensor, the second UWB sensor, and the third UWB sensor, and configured to:
   identify a spatial location of a first beacon based on triangle localization and first UWB transmissions sensed by the first UWB sensor, the second UWB sensor, and the third UWB sensor;
   identify a spatial location of a second beacon based on triangle localization and second UWB transmissions sensed by the first UWB sensor, the second UWB sensor, and the third UWB sensor;
   identify a spatial location of a third beacon based on triangle localization and first UWB transmissions sensed by the first UWB sensor, the second UWB sensor, and the third UWB sensor; and
   generate a spatial location of the mobile platform, as a function of the spatial location of the first beacon, the spatial location of the second beacon, and the spatial location of the third beacon.

16. The mobile platform localization system of claim 15, wherein UWB localizer module further comprises an output module to generate the spatial location of the mobile platform using a triangle location method.

17. The mobile platform localization system of claim 16, wherein the output module further provides the spatial location of the mobile platform to an integrated localization module onboard the mobile platform.

18. The mobile platform localization system of claim 17, wherein the UWB localizer module further comprises a mapping module that references stored map information and validates the spatial location of the mobile platform based on the map information.

19. The mobile platform localization system of claim 18, wherein the UWB localizer module further provides the spatial location of the mobile platform to an integrated localization module onboard the mobile platform.

* * * * *